(12) United States Patent
Fasolino et al.

(10) Patent No.: US 12,216,269 B2
(45) Date of Patent: Feb. 4, 2025

(54) DEFORMABLE MIRROR WITH MAGNETICALLY RECEPTIVE FERROUS BACKING

(71) Applicant: Raytheon Company, Waltham, MA (US)

(72) Inventors: Stephen T. Fasolino, McKinney, TX (US); Peter Chung, Greenville, TX (US); Alexander McCown, McKinney, TX (US); Brett A. Miller, McKinney, TX (US); Jesse Dearden, McKinney, TX (US)

(73) Assignee: Raytheon Company, Arlington, VA (US)

( * ) Notice: Subject to any disclaimer, the term of this patent is extended or adjusted under 35 U.S.C. 154(b) by 866 days.

(21) Appl. No.: 17/373,658

(22) Filed: Jul. 12, 2021

(65) Prior Publication Data

US 2023/0011487 A1 Jan. 12, 2023

(51) Int. Cl.
*G02B 26/08* (2006.01)

(52) U.S. Cl.
CPC ................................ *G02B 26/0825* (2013.01)

(58) Field of Classification Search
None
See application file for complete search history.

(56) References Cited

U.S. PATENT DOCUMENTS

| 4,046,462 | A | 9/1977 | Fletcher et al. |
|---|---|---|---|
| 6,293,680 | B1 | 9/2001 | Bruns |
| 7,708,415 | B2 | 5/2010 | Griffith et al. |
| 7,780,300 | B2 | 8/2010 | Falk |
| 8,079,721 | B2 | 12/2011 | Hammann |
| 8,162,494 | B2 * | 4/2012 | Hamelinck ........ G02B 26/0825 |
| | | | 359/848 |
| 8,444,280 | B2 | 5/2013 | Borra et al. |
| 9,709,713 | B1 | 7/2017 | Chen |
| 2004/0109236 | A1 * | 6/2004 | Nishioka ................ G02B 7/102 |
| | | | 359/643 |
| 2009/0067027 | A1 | 3/2009 | Hennigan |
| 2010/0027143 | A1 | 2/2010 | Angel |
| 2014/0346156 | A1 | 11/2014 | Bischof |
| 2015/0168673 | A1 | 6/2015 | Devilliers et al. |

(Continued)

FOREIGN PATENT DOCUMENTS

| CN | 105842844 A | 8/2016 |
|---|---|---|
| DE | 19615809 A1 | 10/1997 |

(Continued)

OTHER PUBLICATIONS

International Search Report for International Application No. PCT/US2022/029021 dated Aug. 2, 2022, 16 pages.

(Continued)

*Primary Examiner* — Jennifer D. Carruth

(57) ABSTRACT

A deformable mirror is provided that can include a mirror assembly having a reflective face sheet with a reflective surface on a front side of the reflective face sheet. The mirror assembly can also comprise one or more ferrous materials positioned within and making up or forming, in part, the mirror assembly. The deformable mirror can also include one or more electromagnets operable to generate a magnetic field that acts on the ferrous materials to deform the reflective face sheet.

38 Claims, 10 Drawing Sheets

(56) References Cited

U.S. PATENT DOCUMENTS

2016/0225505 A1    8/2016  Pascall
2019/0049717 A1    2/2019  Man

FOREIGN PATENT DOCUMENTS

EP    0025834 A2    4/1981
EP    0769712 A1    4/1997
EP    2538152 A1    12/2012

OTHER PUBLICATIONS

Lemmer et al., Mathematical and computational modeling of a ferrofluid deformable mirror for high-contrast imagng, Advances in Optical and Mechanical Technologies for Telescopes and Instrumentation II, Jul. 22, 2016, 15 pages, SPIE, Bellingham, WA.

\* cited by examiner

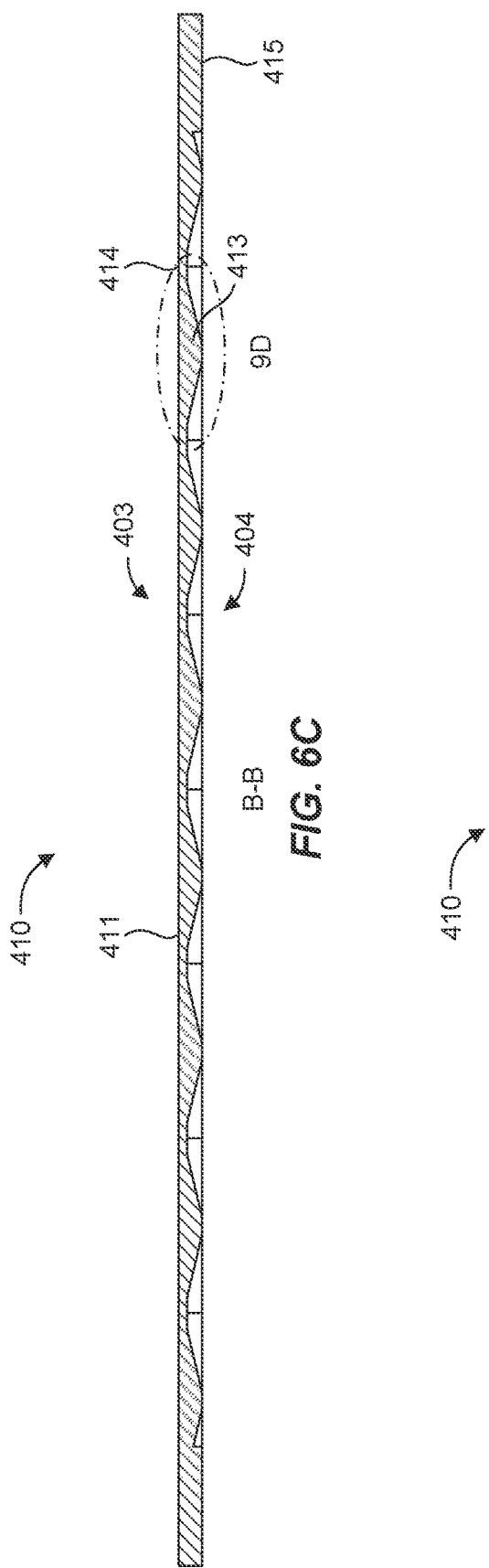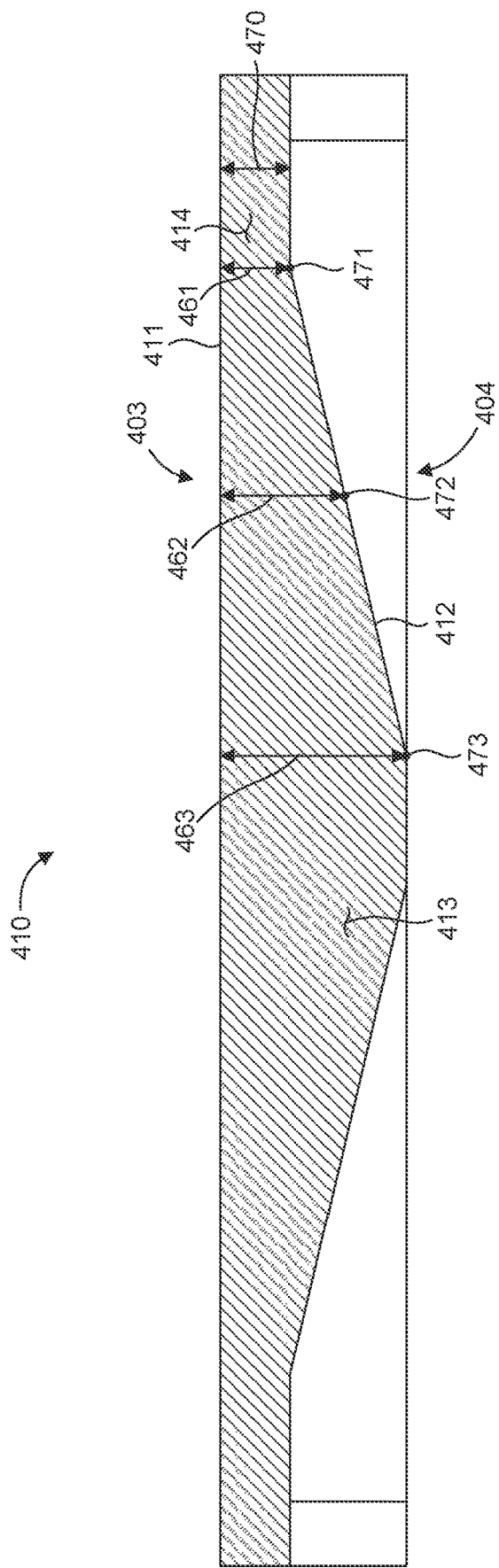

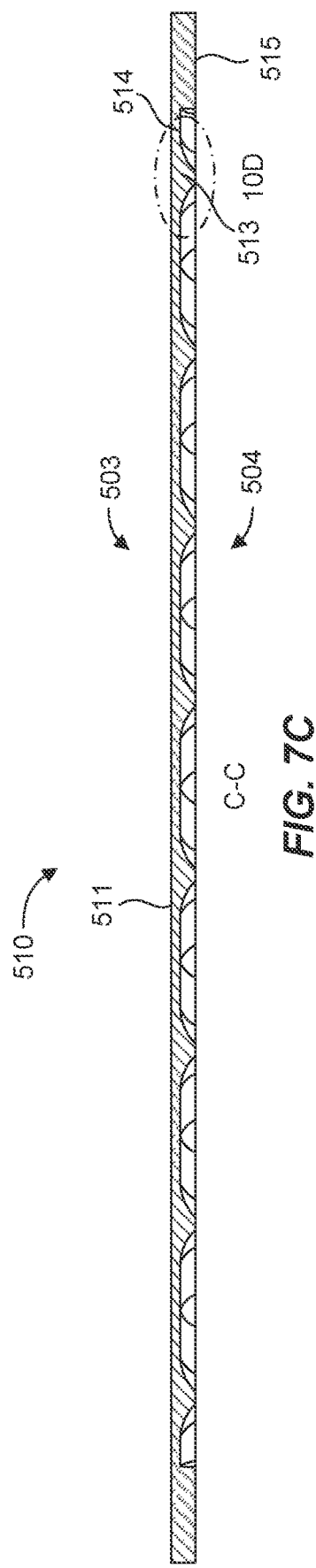
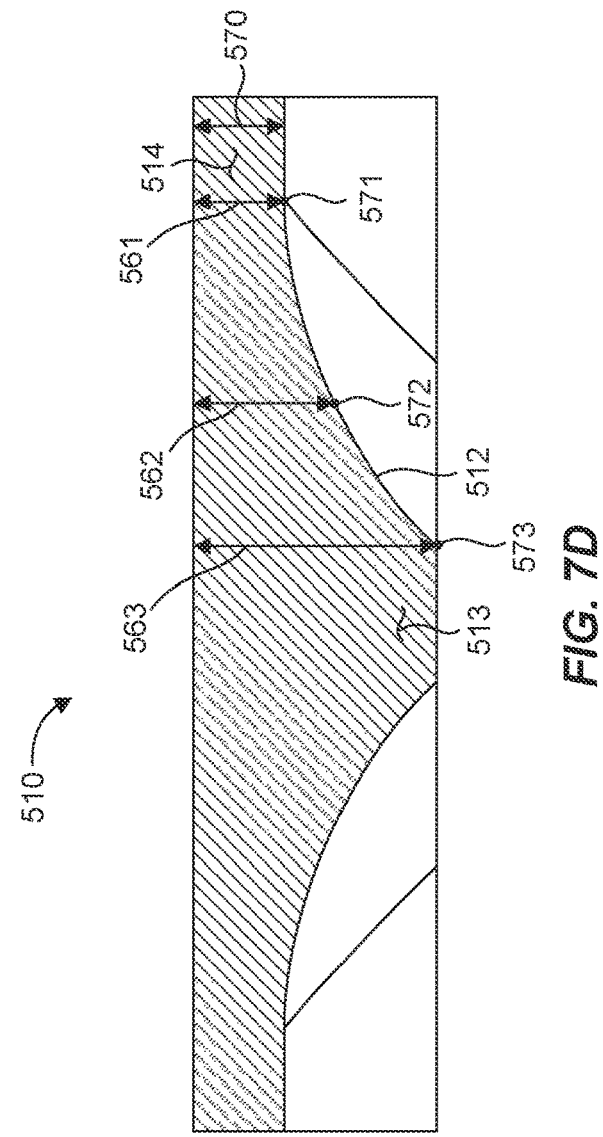

DEFORMABLE MIRROR WITH MAGNETICALLY RECEPTIVE FERROUS BACKING

BACKGROUND

Adaptive optics technology is used to improve the performance of optical systems, typically by reducing the effect of incoming wave front distortions by deforming a mirror in order to compensate for the distortion. Adaptive optics are often used to remove the effects of atmospheric distortion, reduce optical aberrations, and correct alignment in optical systems, and therefore finds broad application, such as in airborne systems (e.g., missiles), astronomical telescopes, laser communication systems, microscopy, optical fabrication, retinal imaging systems, etc. Adaptive optics measures the distortions in a wave front and compensates for the distortions with a device (e.g., a deformable mirror) that corrects those errors. Many types of deformable mirrors currently exist, including segmented mirrors, continuous faceplate mirrors (e.g., with discrete actuators or magnetic actuators), and Ferro fluid liquid mirrors.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIGS. 6A-6D illustrate a non-uniform thickness reflective face sheet of a mirror assembly of a deformable mirror in accordance with another example of the present disclosure.

FIGS. 7A-7D illustrate a non-uniform thickness reflective face sheet of a mirror assembly of a deformable mirror in accordance with another example of the present disclosure.

Figure 1:
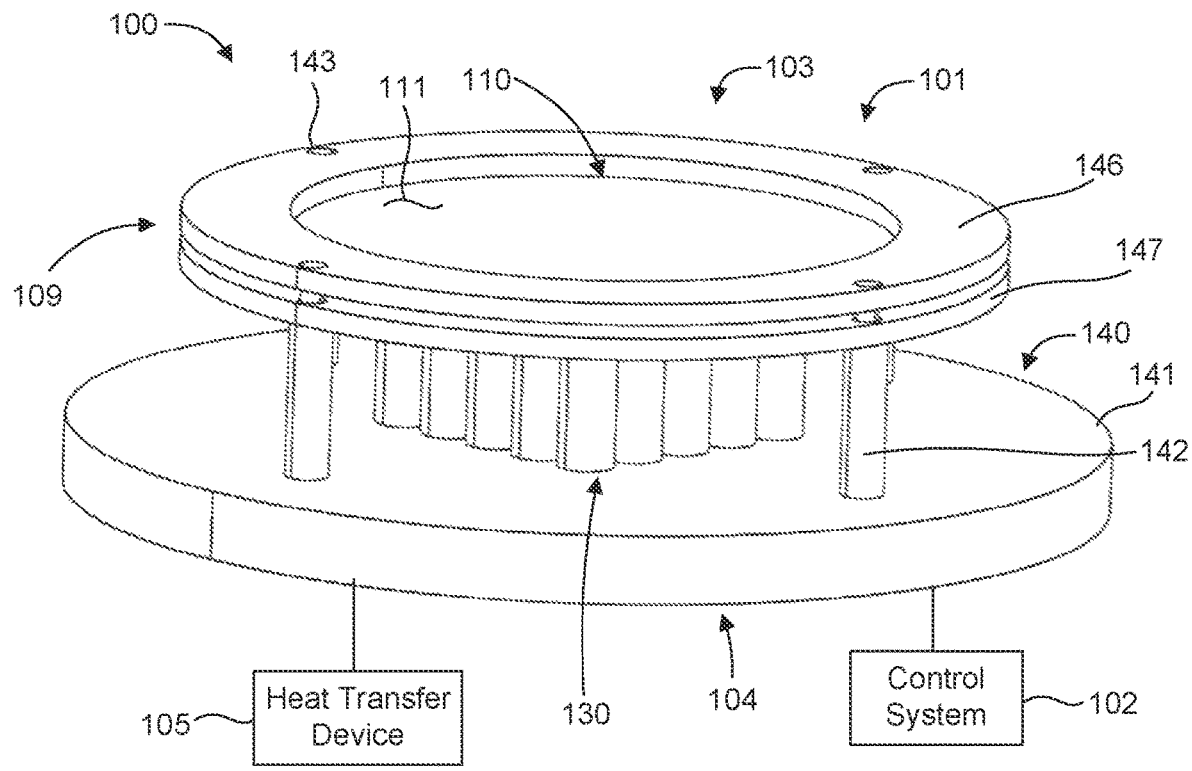
FIG. 1 is a top perspective view of a deformable mirror and deformable mirror system in accordance with an example of the present disclosure.
Figure 2:
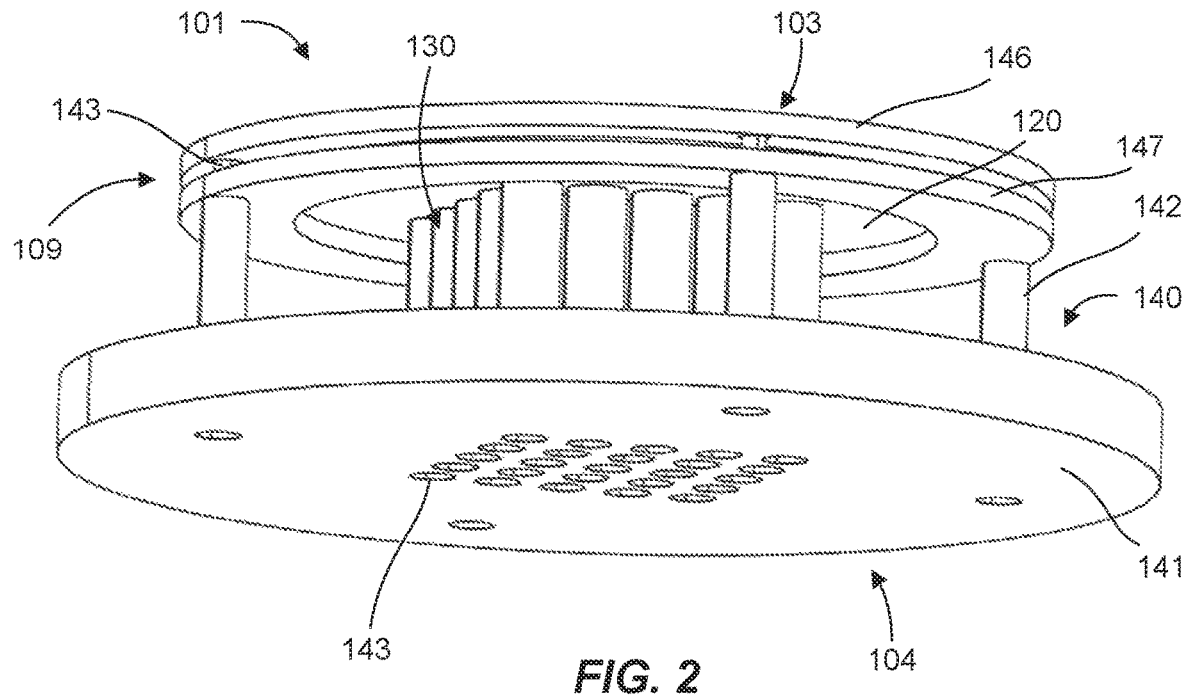
FIG. 2 is a bottom perspective view of the deformable mirror and system of FIG. 1.
Figure 3:
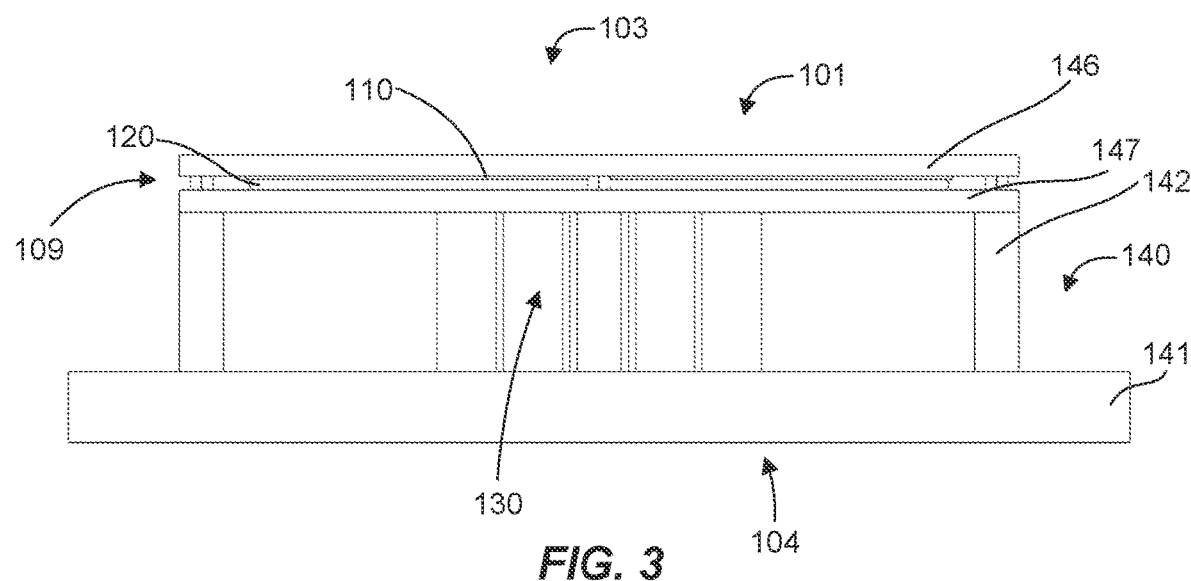
FIG. 3 is a front view of the deformable mirror and system of FIG. 1.

Reference will now be made to the exemplary embodiments illustrated, and specific language will be used herein to describe the same. It will nevertheless be understood that no limitation of the scope of the invention is thereby intended.

DETAILED DESCRIPTION

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

According to one example of the present disclosure, a deformable mirror is provided that can include a mirror assembly. The mirror assembly can comprise a reflective face sheet having a reflective surface on a front side of the reflective face sheet, and one or more ferrous materials selectively positioned within the mirror assembly. The deformable mirror can further comprise one or more electromagnets operable to generate a magnetic field that acts on the one or more ferrous materials to deform the reflective face sheet.

In one example, the one or more ferrous materials can comprise ferrous particles integrated into the reflective face sheet. The reflective face sheet can have a non-uniform thickness between the front side of the reflective face sheet and a back side that is opposite the front side to provide stiffness for the reflective face sheet. The non-uniform thickness of the reflective face sheet can be defined by a pattern formed in the back side. The pattern can comprise an array of polygon shapes.

In another example, the deformable mirror can also comprise a base in support of the mirror assembly and the one or more electromagnets. The base can comprise mounting features for mounting the one or more electromagnets to the base. For example, the one or more electromagnets can be positioned relative to a back side of the reflective face sheet opposite the front side. The one or more electromagnets can comprise a plurality of electromagnets.

In one aspect of the disclosure, the mirror assembly can comprise a compliant ferrous backing attached to a back side of the reflective face sheet opposite the front side. The one or more ferrous materials can comprise ferrous particles embedded into the compliant ferrous backing. In one example, the ferrous particles can be distributed non-uniformly throughout the compliant ferrous backing.

The compliant ferrous backing can comprise a relatively high ferrous particle concentration portion having a relatively higher concentration of the ferrous particles and a relatively low ferrous particle concentration portion having a relatively lower concentration of the ferrous particles. The high ferrous particle concentration portion can be part of a plurality of high ferrous particle concentration portions, and the low ferrous particle concentration portion can be part of a plurality of low ferrous particle concentration portions, where the plurality of high and low ferrous particle portions can form a pattern in the compliant ferrous backing. In one example, the pattern can comprise an array of polygon shapes.

According to one aspect, the reflective face sheet can comprise a uniform thickness from the front side to the back side. On the other hand, the reflective face sheet can have a non-uniform thickness between the front side of the reflective face sheet and a back side that is opposite the front side to provide stiffness for the reflective face sheet. The non-uniform thickness of the reflective face sheet can be defined by a pattern formed in the back side. The pattern can comprise an array of polygon shapes. The deformable mirror can also comprise a compliant ferrous backing molded to fit within the pattern formed in the back side of the reflective face sheet, wherein ferrous materials in the form of ferrous particles can be embedded into the compliant ferrous backing.

In one aspect of the disclosure, the mirror assembly can comprise a thin ferrous metallic backing positioned relative to a back side of the reflective face sheet opposite the front side, the thin ferrous metallic backing comprising a ferrous material of the one or more ferrous materials.

In one aspect of the present disclosure, a deformable mirror system is provided. The deformable mirror system can comprise a deformable mirror that can include a mirror assembly. The mirror assembly can comprise a reflective face sheet having a reflective surface on a front side of the reflective face sheet, and one or more ferrous materials selectively positioned within the mirror assembly. The deformable mirror can further comprise one or more electromagnets operable to generate a magnetic field that acts on the one or more ferrous materials to deform the reflective face sheet.

The deformable mirror system can further comprise a control system operably coupled to the one or more electromagnets to control the magnetic field, and thereby a deformation of the reflective face sheet.

In one aspect of the disclosure, the mirror assembly can comprise a compliant ferrous backing attached to a back side of the reflective face sheet opposite the front side. The one or more ferrous materials can comprise ferrous particles embedded into the compliant ferrous backing. In one example, the ferrous particles can be distributed non-uniformly throughout the compliant ferrous backing.

The compliant ferrous backing can comprise a relatively high ferrous particle concentration portion having a relatively higher concentration of the ferrous particles and a relatively low ferrous particle concentration portion having a relatively lower concentration of the ferrous particles. The high ferrous particle concentration portion can be part of a plurality of high ferrous particle concentration portions, and the low ferrous particle concentration portion can be part of a plurality of low ferrous particle concentration portions, where the plurality of high and low ferrous particle portions can form a pattern in the compliant ferrous backing. In one example, the pattern can comprise an array of polygon shapes.

In one aspect of the disclosure, the mirror assembly can comprise a thin ferrous metallic backing attached to a back side of the reflective face sheet opposite the front side.

According to one aspect, the reflective face sheet can comprise a uniform thickness from the front side to the back side. On the other hand, the reflective face sheet can have a non-uniform thickness between the front side of the reflective face sheet and a back side that is opposite the front side to provide stiffness for the reflective face sheet. The non-uniform thickness of the reflective face sheet can be defined by a pattern formed in the back side. The pattern can comprise an array of polygon shapes. The deformable mirror can also comprise a compliant ferrous backing molded to fit within the pattern formed in the back side of the reflective face sheet, wherein ferrous particles are embedded into the compliant ferrous backing.

In one aspect of the present disclosure, a method for facilitating active shape control of a mirror is provided. The method can comprise obtaining a mirror assembly comprising a reflective face sheet, positioning one or more ferrous materials within at least a portion of the mirror assembly, and disposing one or more electromagnets about the mirror assembly operable to generate a magnetic field that acts on the one or more ferrous materials to deform the reflective face sheet and thereby control a shape of the reflective surface.

In one example, the method can further comprise adhering a compliant ferrous backing onto a back side of the reflective face sheet. The one or more ferrous materials can comprise ferrous particles distributed throughout the compliant ferrous backing. In one example, the ferrous particles can be distributed non-uniformly throughout the compliant ferrous backing. The compliant ferrous backing can comprise a relatively high ferrous particle concentration portion having a relatively higher concentration of the ferrous particles and a relatively low ferrous particle concentration portion having a relatively lower concentration of the ferrous particles. The high ferrous particle concentration portion can be part of a plurality of high ferrous particle concentration portions, and the low ferrous particle concentration portion can be part of a plurality of low ferrous particle concentration portions. The plurality of high and low ferrous particle portions can form a pattern in the compliant ferrous backing. The pattern can comprise an array of polygon shapes.

To further describe the present technology, examples are now provided with reference to the figures. With reference to FIGS. 1-4, one example of a deformable mirror system 100 is illustrated. The deformable mirror system 100 can comprise a deformable mirror 101 and a control system 102 operable to control one or more controllable components the deformable mirror 101. The deformable mirror 101 can comprise a mirror assembly 109 including a reflective face sheet 110 and a compliant ferrous backing 120 (or a thin ferrous metallic backing (see FIG. 9)). The deformable mirror 101 can further comprise one or more electromagnets 130 and a support structure 140. The deformable mirror 101 is shown in a top perspective view in FIG. 1, a bottom perspective view in FIG. 2, a front view in FIG. 3, and a front view with portions of the support structure 140 removed in FIG. 4. A front side 103 and a back side 104 of the deformable mirror 101 and its components are indicated generally in FIGS. 1-4.

The compliant ferrous backing 120 of the mirror assembly 109 can be formed of a compliant material that has one or more ferrous materials positioned within at least a portion of the mirror assembly. For example, as will be discussed in more detail below, the one or more ferrous materials can comprise ferrous particles distributed throughout a compliant ferrous backing, or in another example, the one or more ferrous materials can comprise a thin ferrous metallic backing. The reflective face sheet 110 of the mirror assembly 109 can cover a front side of the compliant ferrous backing 120 such that a back side of the reflective face sheet 110 is adhered or otherwise secured to the compliant ferrous backing 120. The reflective face sheet 110 can have a reflective surface 111 on a front side of the reflective face sheet 110 opposite a back side. The reflective face sheet 110 can be constructed of any suitable material, such as silicon, glass, aluminum, beryllium, or others as will be apparent to those skilled in the art.

The electromagnets 130 can be positioned relative to the back side of the mirror assembly 109 (e.g., behind the compliant ferrous backing 120). Any suitable number of electromagnets 130 can be utilized, such as only a single electromagnet or multiple electromagnets. Additionally, the electromagnets 130 can be the same size or different sizes (e.g., varying in diameter, height, etc.).

The control system 102 can be operably coupled to electromagnets 130 to control a magnetic field generated by the electromagnets 130. The various structural components of the deformable mirror 101 (e.g., the support structure 140) can be made of non-ferromagnetic materials, such as aluminum, to avoid undesirable magnetic field effects during operation of the electromagnets 130.

The compliant ferrous backing 120 can be formed using an adhesive binder that has a plurality of ferrous particles distributed throughout the adhesive binder. For example, the adhesive binder can be formed from an epoxy, silicone, fluorosilicone, polyurethane, rubber, or other similar materials. A ferrite powder can be mixed into the adhesive binder to distribute the ferrous particles evenly throughout the adhesive binder. A layer of the adhesive binder with the ferrous particles can then be adhered to the back side of the reflective face sheet 110 to form the compliant ferrous backing 120. The compliant ferrous backing 120 can be formed of a material having properties to allow the compliant ferrous backing 120 to be relatively rigid or stiff, such that it holds its shape, while also being sufficiently compliant for the purposes described herein. For example, the compliant ferrous backing 120 can be formed from a material having a shore hardness of at least 10, namely between 10 and 100. An example of an epoxy suitable for use as an adhesive binder for the compliant ferrous backing 120 is known under the trade name MASTERSIL, such as MASTERSIL 980. In some examples, non-adhesive materials can be used as a base material through which the ferrous particles can be distributed. A non-adhesive material can be adhered to the back of the reflective face sheet 110 via a separate adhesive.

In some examples, a weight percentage of the ferrous particles in the compliant ferrous backing 120 can be from 20% to 70%. In some examples, the ferrous particles used in the compliant ferrous backing 120 can be sized between 1 μm to 1 mm in diameter. However, these are not intended to be limiting in any way. Indeed, other weight percentages are contemplated, which can depend upon the particular application.

The electromagnets 130 can be operable to generate a magnetic field that acts on the ferrous particles in the compliant ferrous backing 120. This magnetic field can cause the compliant ferrous backing 120 to locally deform based on the position and strength of the magnetic field generated by the electromagnets 130. The deformations of the compliant ferrous backing 120 function to cause a deformation of the reflective face sheet 110 based on the interface between the compliant ferrous backing 120 and the reflective face sheet 110.

In particular, as current flows through one or more of the electromagnets 130, one or more localized magnetic fields are created. The magnetic field(s) generated by the electromagnets 130 can act on the compliant ferrous backing 120 to induce a localized deformation in the compliant ferrous backing 120. This in turn can induce a localized stress or load on the reflective face sheet 110 to locally deform the reflective face sheet 110 along with the compliant ferrous backing 120. In this manner, the electromagnets 130 can be referred to as actuators that act on the mirror assembly 109 to cause select; precision deformations within the mirror assembly 109. For example, the electromagnets can pull on or actuate the compliant ferrous backing 120 to deform the reflective face sheet 110 adhered to the compliant ferrous backing 120. An actuator stroke can refer to the deflection of the reflective surface 111 by a single electromagnet 130 or actuator; referred to as a "poke."

One benefit of the present technology is that forces exerted on the reflective face sheet 110 do not produce "quilting" effects often associated with discrete actuators (e.g., mechanical or electromechanical actuators) in other types of deformable mirrors. This is because the actuators are not mechanically coupled to the face sheet. In prior deformable mirrors where the actuators are mechanically coupled to the face sheet; differences in the coefficient of thermal expansion (CTE) between the bonding material and the other surrounding materials contribute to the quilting patterns as temperature changes.

In one aspect, the control system 102 can be operable to independently control (e.g., independently power) each of the electromagnets 130 for optimum shape control of the reflective face sheet 110. For example, pokes of each electromagnet 130 can be measured by an interferometer. A linear combination of these pokes can create many different mirror shapes. In a particular aspect, the control system 102 can be operable to reverse polarity of the electromagnets 130 (e.g., reverse current polarity of the individual electromagnets 130, such as reversed polarity in adjacent electromagnets) to provide further control over the shape of the reflective face sheet 110, and to create pokes between actuators. Thus, the electromagnets 130 can be energized in a coordinated manner by the control system 102 to generate a magnetic field operable to achieve a desired shape or response of the reflective face sheet 110. For example, a boundary condition shape on the reflective face sheet 110 can be controlled to achieve optical power correction for various mirror angles of incidence, to control or correct wave front error, etc.

In one aspect, the deformable mirror 101 can include a heat transfer device 105 thermally coupled to the electromagnets 130 to facilitate cooling the electromagnets 130, which can allow for more current, thereby increasing actuator stroke. The heat transfer device 105 can be of any suitable type or configuration known in the art, such as any suitable passive or active heat transfer device.

For example, the heat transfer device 105 can include a liquid coolant contained in cooling jackets about the electromagnets 130. The liquid can be heated by the electromagnets 130 (e.g., by wire coils or windings of the electromagnets) and can flow away from the electromagnets 130 where the liquid can be cooled, e.g., by a heat exchanger, fins, etc. Fluid flow can be forced to actively cool the electromagnets 130 or it can be driven by natural convection to passively cool the electromagnets 130. Any suitable liquid coolant can be utilized, such as ethylene glycol mixed with water (EGW), or polyalphaolefin (PAO).

In one aspect, the support structure 140 can include a base 141 in support of the electromagnets 130 and the mirror assembly 109 (i.e., the compliant ferrous backing 120 and the reflective face sheet 110). The support structure 140 can also include one or more stand-off supports 142 coupling the mirror assembly 109 to the base 141. The mirror assembly 109 can be secured to the stand-off supports 142 in any suitable manner.

For example, the support structure 140 can include a front clamping ring 146 and a back clamping ring 147. The mirror assembly 109 can be disposed between the front clamping ring 146 and the back clamping ring 147 such that the front clamping ring 146 and the back clamping ring 147 support and secure the mirror assembly 109 to the stand-off supports 142. One or more mounting features 143 can be used to attach the front clamping ring 146 and the back clamping ring 147 to the stand-off supports 142 and to secure the mirror assembly 109 between the front clamping ring 146 and the back clamping ring 147. For example, the mounting features 143 can comprise one or more fasteners 143 that tighten the front clamping ring 146 to the back clamping ring 147 and that connect the front clamping ring 146 and the back clamping ring 147 to the stand-off supports 142. The mounting features 143 can be of any suitable type or configuration, such as a socket, pin, tab, bracket, fastener, or any other suitable mounting device or assembly.

In one example, the mirror assembly 109 can be magnetically attached to the back clamping ring 147 and the front clamping ring 146 can be omitted. Because the mirror assembly 109 comprises the compliant ferrous backing 120, one or more magnets can be distributed throughout the back clamping ring 147. The mirror assembly 109 can then be attached and held to the back clamping ring 147 via a magnetic attraction between the magnets in the back clamping ring 147 and the compliant ferrous backing 120. This can help ensure that uneven stress is not placed on the reflective face sheet 110 when it is mounted to the support 140. Uneven stresses on the reflective face sheet 110 can cause distortions in the deformable mirror 101.

In one aspect, the compliant ferrous backing 120 and the electromagnets 130 can be physically independent from one another (e.g., not affixed or directly joined to one another). In other words, in this example, the compliant ferrous backing 120 and the electromagnets 130 can be in direct physical contact, but not attached or joined together at such an interface. Thus, the electromagnets 130 are not directly physically coupled the compliant ferrous backing 120 or the reflective face sheet 110. Physically separate components can enable a modular design where the electromagnets 130, the compliant ferrous backing 120, and/or the reflective face sheet 110 can be easily reconfigured or replaced for a given application or repair. This is not to be limiting in any way. Indeed, examples are contemplated where the compliant ferrous backing 120 and one or more of the electromagnets 130 are directly joined together.

A thickness of the compliant ferrous backing 120 can influence actuator stroke. Therefore, the thickness of the compliant ferrous backing 120 can be changed to achieve a desired response. In addition, the reflective face sheet 110 can have any suitable size or shape, such as circular, elliptical, polygonal (e.g., triangle, rectangle, pentagon, hexagon, octagon, etc.), freeform, etc. Different face sheet configurations (e.g., size, shape, and non-uniform thickness characteristics described below) can provide different performance attributes. Thus, the reflective face sheet 110 and/or the compliant ferrous backing 120 can be selected or changed to achieve a desired mirror response.

Figure 4:
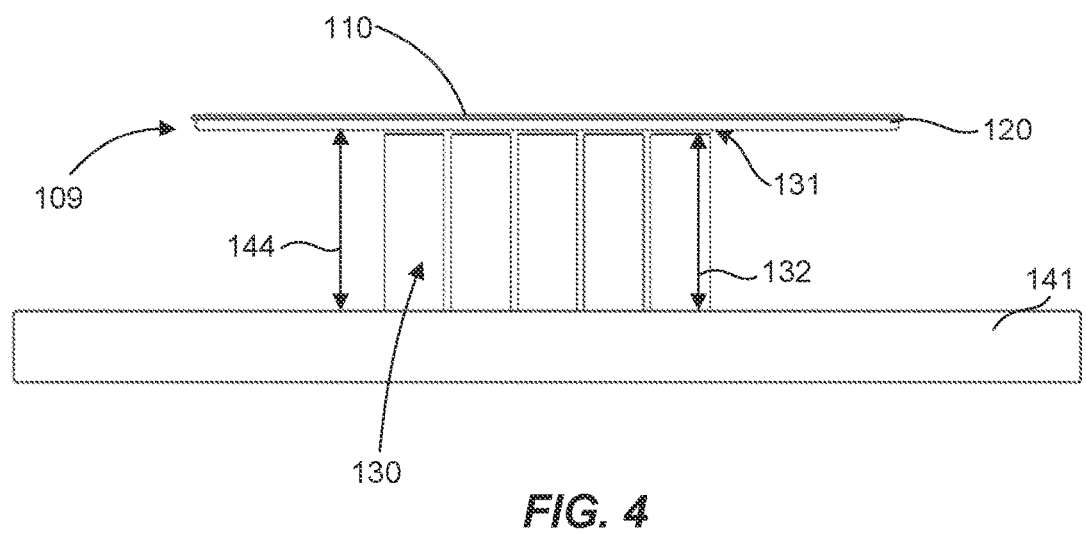
FIG. 4 is a front view of the deformable mirror and system of FIG. 1 with portions of the support structure of the deformable mirror removed.

In one example, the compliant ferrous backing 120 and the electromagnets 130 can be physically separated from one another by a gap 131, as shown in FIG. 4. Such a gap 131 can be provided by positioning the compliant ferrous backing at a height 144 from the base 141 that exceeds a height 132 of the electromagnets 130 from the base 141. The gap 131 can be of any suitable size to enable ease of assembly/disassembly for reconfiguring or replacing components, although the gap 131 may be minimized for improved influence of the electromagnets 130 on the compliant ferrous backing 120.

The base 141 can include mounting features 143 for mounting the electromagnets 130 to the base 141. The mounting features 143 can be of any suitable type or configuration, such as a socket, pin, tab, bracket, fastener, or any other suitable structure for mounting an electromagnet 130 to the base 141. In some examples, a number of the mounting features 143 can exceed a number of the electromagnets 130 to provide alternate mounting arrangements for the electromagnets 130 on the base 141. Thus, an electromagnet 130 array pattern, pitch, spacing, quantity, size, shape, etc. can be adjusted by appropriately configuring the number and location of the mounting features 143 on the base 141.

In general, the reflective face sheet 110 can have any suitable configuration (e.g., size, shape, thickness, etc.) for a given application. For example, in some applications (e.g., when the deformable mirror 101 is mounted on a static or slow-moving platform) a uniform thickness may be suitable for the reflective face sheet 110. In other applications (e.g., when the deformable mirror 101 is mounted on a dynamic or fast-moving platform), a uniform thickness may not provide the performance required of the reflective face sheet 110. In a particular example, in order to operate in a tactical, airborne environment, a uniform thickness reflective face sheet may not allow for an adequate actuator stroke, since the face sheet must be thick enough to minimize wave front error due to gravity sag (e.g., mirror deflection due to gravity) as well as increasing the natural frequency of the mirror surface (e.g., maximize structural modes so that vibration does not impact performance). Thus, the thickness required to provide adequate stiffness for gravity sag and structural mode considerations can greatly limit the magnitude of wave front error that can be corrected by a uniform thickness face sheet.

Therefore, in one aspect, the reflective face sheet 110 can have a non-uniform thickness between the front and back sides of the reflective face sheet 110 to provide adequate stiffness for the reflective face sheet 110 in meeting gravity sag and structural mode design objectives while also providing for sufficient actuator stroke to correct a large magnitude of wave front error. In other words, a non-uniform thickness of the reflective face sheet 110 can improve actuator stroke (e.g., increase influence of actuators on the face sheet), while simultaneously improving gravity sag and stiffness over a uniform thickness face sheet. Thus, a non-uniform thickness reflective face sheet 110 can be designed to optimize (e.g., maximize) actuator stroke and minimize gravity sag, which can facilitate tuning a mirror for different platforms. These principles are discussed in more detail below with reference to FIGS. 5A-7D.

FIGS. 5A-7D illustrate non-uniform thickness reflective face sheets 310, 410, 510 in accordance with several examples of the present disclosure. It should be noted that the topology due to non-uniform thickness of the reflective face sheets 310, 410, 510 is evident on respective back sides 304, 404, 504 of the reflective face sheets 310, 410, 510, as the respective reflective front sides 303, 403, 503 are maintained flat or featureless to provide suitable reflective surfaces 311, 411, 511.

The non-uniform thickness of the reflective face sheets 310, 410, 510 can be configured in any suitable manner to provide a desired stiffness and/or actuator responsiveness. In one aspect, the non-uniform thickness can be defined by a pattern formed on the respective back sides 304, 404, 504 of the reflective face sheets 310, 410, 510. Any suitable uniform or non-uniform pattern can be implemented, and can include any shape or combination of shapes, lines, curves, raised portions, etc. of any suitable size or configuration. In one illustrated example, the pattern comprises a polygon (e.g., hexagon) shape in a "honeycomb" pattern (see FIGS. 5A-5D).

In another example, the non-uniform thickness can be defined on the back sides 304, 404, 504 by various or random shapes, lines, curves, etc. of various sizes. In one aspect, the non-uniform thickness can be defined on the back sides 304, 404, 504 in a symmetrical relationship with the outer or perimeter shape of the respective reflective face sheets 310, 410, 510, which can provide a symmetric or uniform distribution of features defining the non-uniform thickness about the reflective face sheets 310, 410, 510. This can locate stiffness enhancing features (e.g., thicker portions, such as the ribs discussed below, or any other similar features) symmetrically or uniformly about the reflective face sheets 310, 410, 510.

In still another example, the non-uniform thickness can be defined on the respective back sides 304, 404, 504 in an asymmetrical relationship with the outer or perimeter shape of the reflective face sheets 310, 410, 510, which can provide an asymmetric or non-uniform distribution of features defining the non-uniform thickness about the reflective face sheets 310, 410, 510. This can locate stiffness enhancing features (e.g., thicker portions) asymmetrically or non-uniformly about the reflective face sheets 310, 410, 510.

A uniform or symmetric distribution of features may be utilized when the reflective face sheets 310, 410, 510 will be primarily oriented facing in a vertical direction (e.g., up or down relative to a gravity direction) or when the reflective face sheets 310, 410, 510 will be subjected to variable and dynamic loading, orientations, etc. A non-uniform or asymmetric distribution of features defining the non-uniform thickness about the reflective face sheets 310, 410, 510 can be utilized when the reflective face sheets 310, 410, 510 will be primarily oriented facing in a horizontal direction (e.g., perpendicular relative to a gravity direction). In this case, a higher concentration of stiffness enhancing features (e.g., thicker portions) can be located in areas of greatest need, such as at a bottom end of the reflective face sheets 310, 410, 510 when oriented facing a horizontal direction to more effectively counteract the effects of gravity sag.

In one aspect, the non-uniform thickness of the reflective face sheets 310, 410, 510 can be configured and defined on the respective back sides 304, 404, 504 to correspond to one or more electromagnets of a deformable mirror. For example, a size, location, etc. of a stiffness enhancing feature (e.g., thicker portions) of the reflective face sheets 310, 410, 510 can be configured to facilitate responsiveness to actuation (e.g., can be configured to increase actuator stroke). The reflective face sheets 310, 410, 510 (e.g., non-uniform shaping) can be manufactured by any suitable process, such as silicon etching and others.

Figure 5B:
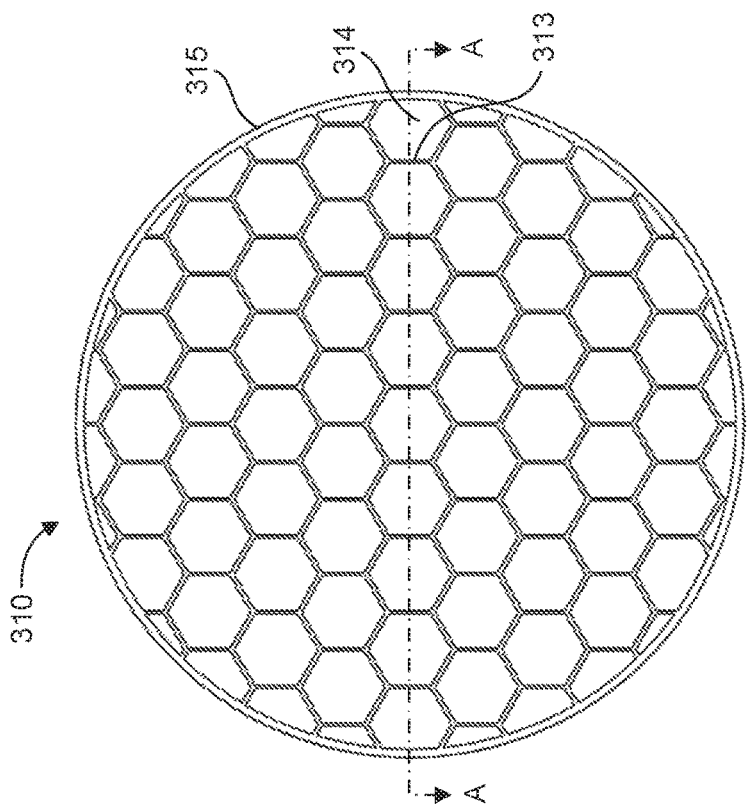
FIGS. 5A-5D illustrate a non-uniform thickness reflective face sheet of a mirror assembly of a deformable mirror in accordance with an example of the present disclosure.
Figure 5A:
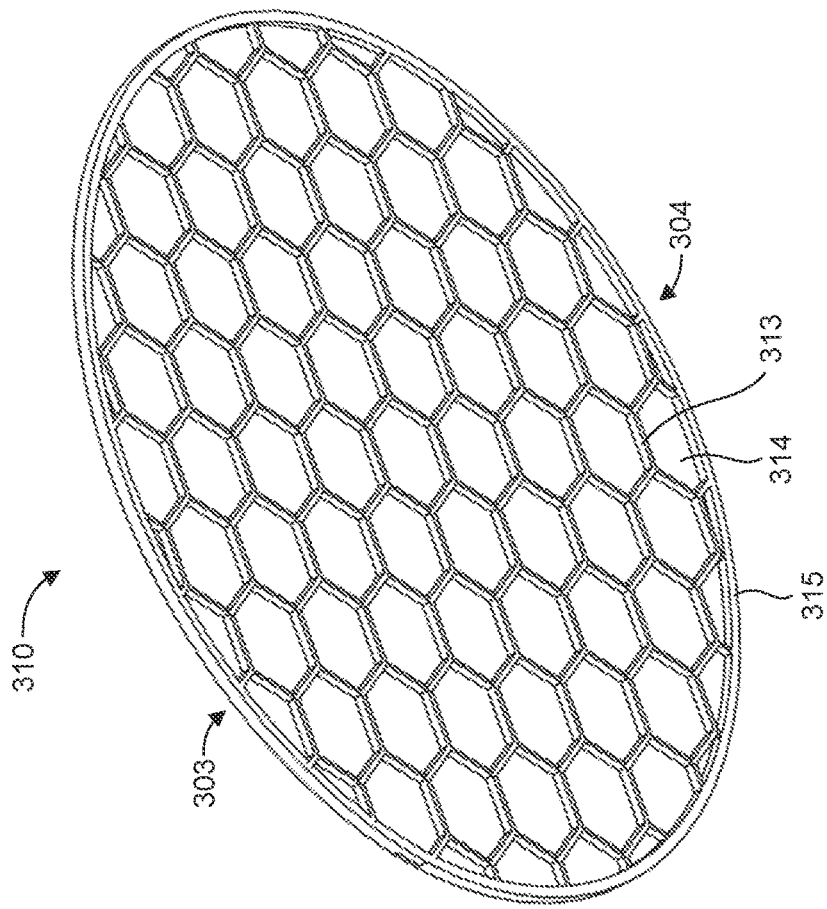
Figure 5C:
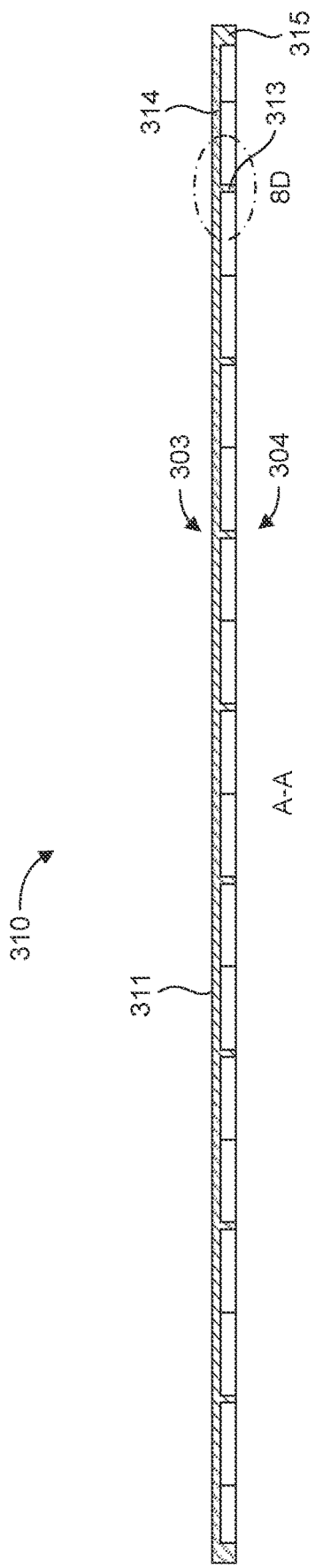
Figure 5D:
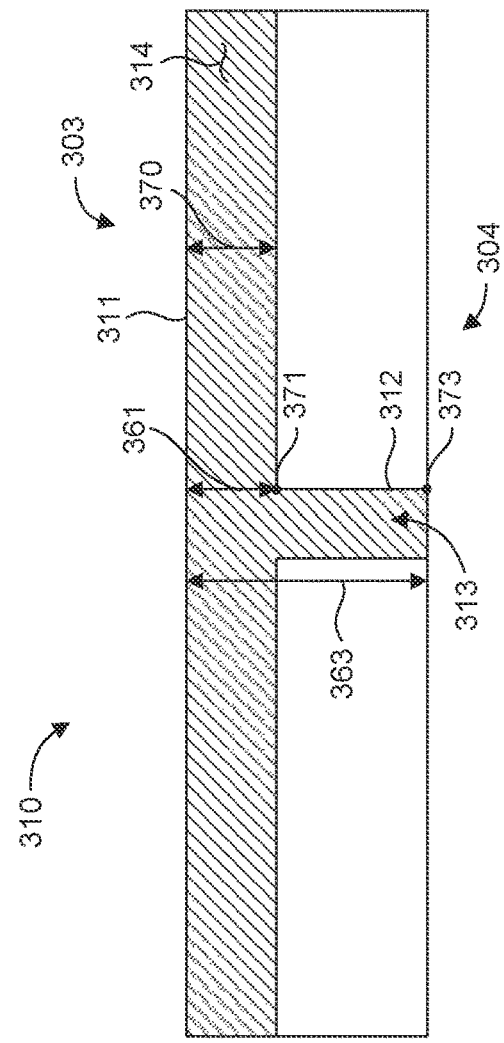
Figure 6B:
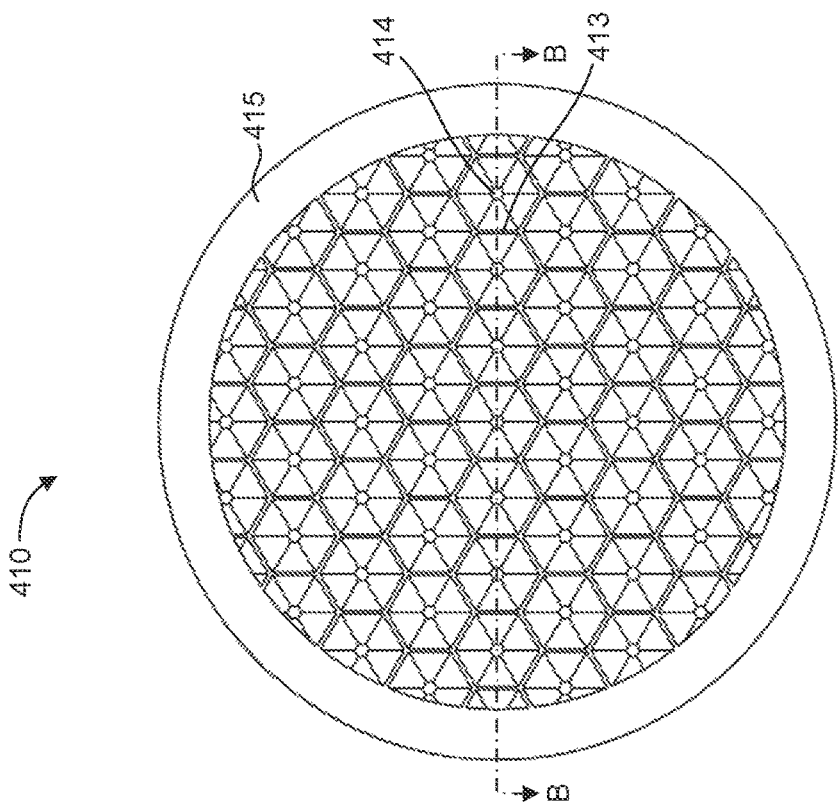
Figure 6A:
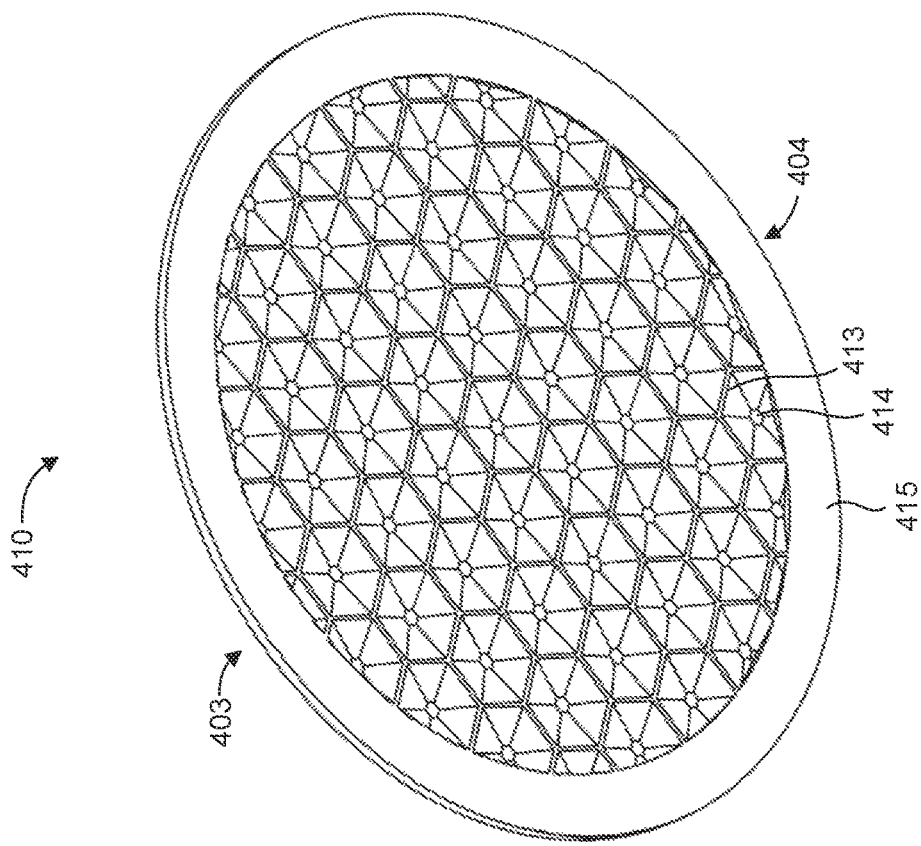

The thickness of the reflective face sheets 310, 410, 510 can vary in any suitable manner and in any location across the reflective face sheets 310, 410, 510, such as an abrupt or step change in thickness, a gradual transition in thickness, or a combination of these. In the example illustrated in FIGS. 5A-5D, the non-uniform thickness is defined by several abrupt step changes in thickness of the back side 304 of the reflective face sheet 310 to form various ribs 313 arranged along the back side 304 in the honeycomb pattern shown. In FIGS. 5A-5D, the ribs 313 are an example of stiffness enhancing features. In this case, as shown in FIG. 5D, which illustrates a detailed cross-section of one of the ribs 313 of the reflective face sheet 310, the illustrated rib 313 has a first thickness 361 at a first location 371 and a second thickness 363 at a second location 373. The first and second thicknesses 361, 363 are different from one another. The first and second locations 371, 373 lie on a planar surface portion 312 on the back side 304 of the reflective face sheet 310 substantially perpendicular to the reflective surface 311 on the front side 303.

The planar surface portion 312 can at least partially define the rib 313 or protrusion, which can comprise a rectangular or other cross-section. In one aspect, the reflective face sheet 310 can have a base portion 314 or layer having a baseline thickness 370, and the ribs 313 can extend beyond the base portion 314 and the baseline thickness 370. The ribs 313 can be integrally formed with the material or structure of the base portion 314 as a single component or the ribs 313 can be a separate or independent component, which may or may not be coupled or affixed to the base portion 314.

In one aspect, a similar type of rib or other protrusion can form a relatively thick rim 315 as a stiffener about a periphery or edge of the reflective face sheet 310 to maintain flexibility of the reflective face sheet 310 while preventing unwanted distortion, such as due to an interface with an adhesive or sealant coupling the reflective face sheet 310 to a compliant ferrous backing. Thus, non-uniform thickness features can also reduce or minimize the sensitivity of the reflective face sheet 310 to the attachment interface to a compliant ferrous backing.

In the examples illustrated in FIGS. 6A-7D, the non-uniform thickness is formed by a gradual change in thickness or a gradual transition of thickness between two points. With regard to the example illustrated in FIGS. 6A-6D, as particularly shown in FIG. 6D, the gradual change in thickness is defined by a planar surface, but this is not to be limiting in any way as a non-planar surface is also contemplated.

In the example shown, the reflective face sheet 410 can comprise a plurality of ribs 413 as examples of stiffness enhancing features. Each of the ribs 413 can have a first thickness 461 at a first location 471, a second thickness 462 at a second location 472, and a third thickness 463 at a third location 473. The first, second, and third thicknesses 461, 462, 463 are different from one another. The first, second, and third locations 471, 472, 473 lie on a planar surface portion 412 on the back side 404 of the reflective face sheet 410 non-perpendicular to the reflective surface 411 on the front side 403.

The planar surface portion 412 can at least partially define the rib 413 or protrusion having a generally trapezoidal cross-section. In one aspect, the reflective face sheet 410 can have a base portion 414 or layer having a baseline thickness 470, and the ribs 413 can extend beyond the base portion 414 and the baseline thickness 470. The ribs 413 can be integrally formed with the material or structure of the base portion 414 as a single component or the ribs 413 can be a separate component, which may or may not be coupled or affixed to the base portion 414.

In one aspect, a similar type of rib or other protrusion can form a relatively thick rim 415 as a stiffener about a periphery or edge of the reflective face sheet 410 to maintain flexibility of the reflective face sheet 410 while preventing unwanted distortion, such as due to an interface with an adhesive or sealant coupling the reflective face sheet 410 to a compliant ferrous backing. Thus, non-uniform thickness features can also reduce or minimize the sensitivity of the reflective face sheet 410 to the attachment interface to a compliant ferrous backing.

Figure 7B:
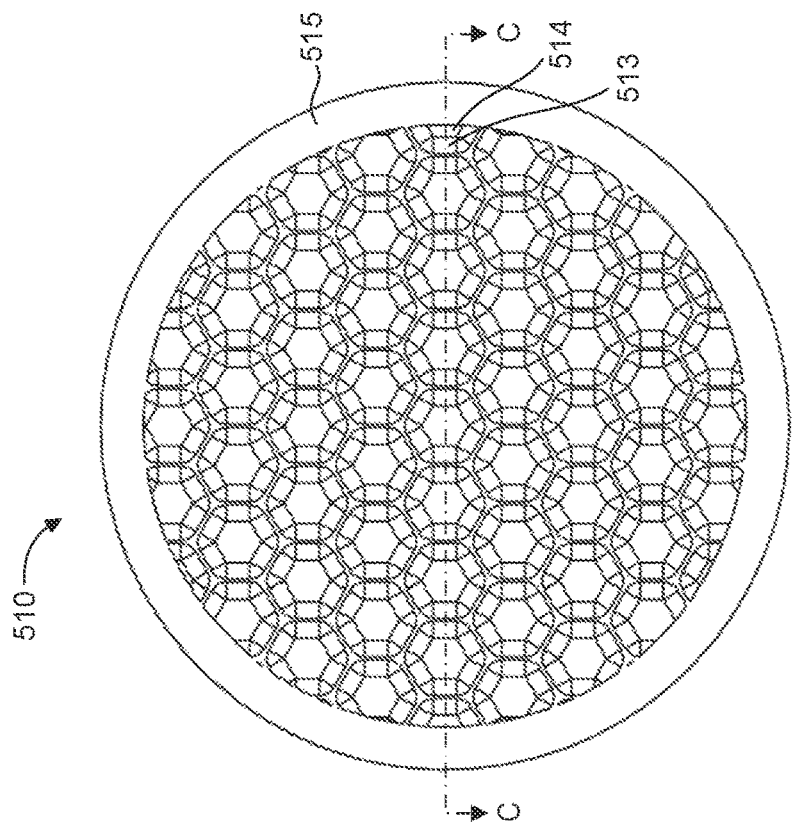
Figure 7A:
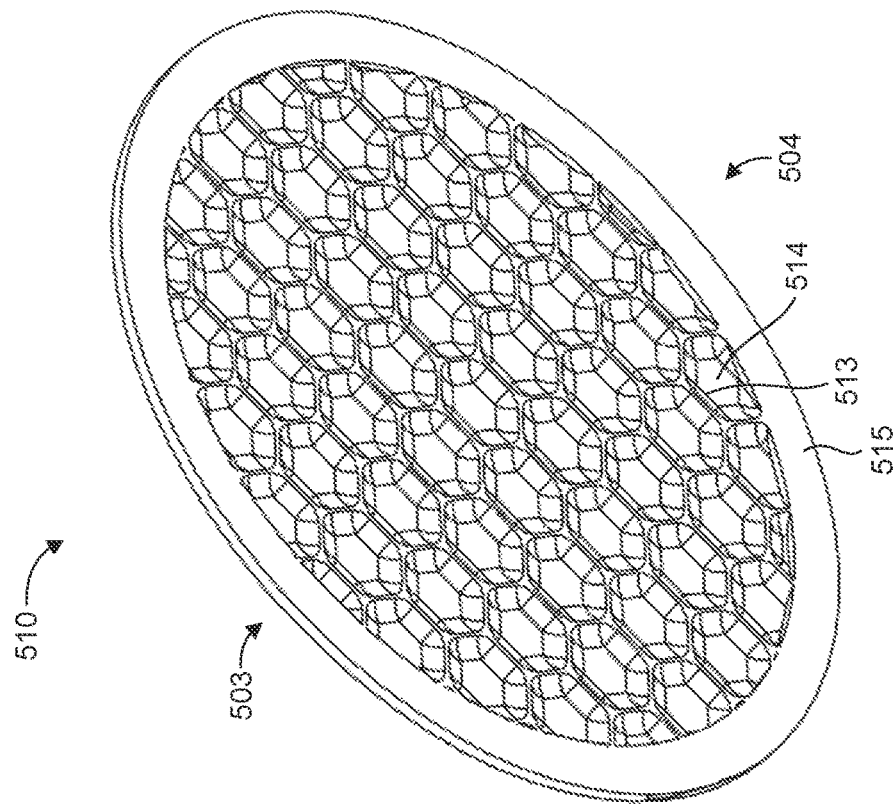

With regard to the example illustrated in FIGS. 7A-7D, as particularly shown in FIG. 7D, the gradual change in thickness is defined by a curved surface. The reflective face sheet 510 can comprise a plurality of ribs 513 as examples of stiffness enhancing features. Each of the ribs 513 can have a first thickness 561 at a first location 571, a second thickness 562 at a second location 572, and a third thickness 563 at a third location 573. The first, second, and third thicknesses 561, 562, 563 are different from one another. The first, second, and third locations 571, 572, 573 lie on a curved surface portion 512 on the back side 504 of the reflective face sheet 510.

The curved surface portion 512 can at least partially define the rib 513 or protrusion. In one aspect, the reflective face sheet 510 can have base portion 514 or layer having a baseline thickness 570, and the ribs 513 can extend beyond the base portion 514 and the baseline thickness 570. The ribs 513 can be integrally formed with the material or structure of the base portion 514 as a single component or the ribs 513 can be a separate component, which may or may not be coupled or affixed to the base portion 514.

In one aspect, a similar type of rib or other protrusion can form a relatively thick rim 515 as a stiffener about a periphery or edge of the reflective face sheet 510 to maintain flexibility of the reflective face sheet 510 while preventing unwanted distortion, such as due to an interface with an adhesive or sealant coupling the reflective face sheet 510 to a compliant ferrous backing. Thus, non-uniform thickness features can also reduce or minimize the sensitivity of the reflective face sheet 510 to the attachment interface to a compliant ferrous backing.

Figure 8A:
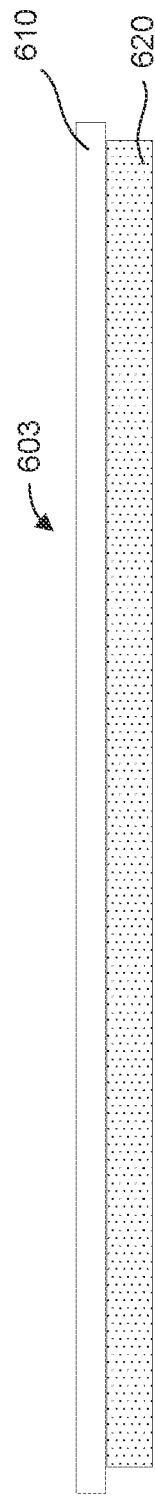
FIGS. 8A-8C illustrate different mirror assemblies for use within a deformable mirror, the mirror assemblies illustrating different interface configurations between a reflective face sheet and a compliant ferrous backing of the mirror assemblies in accordance with various examples of the present disclosure.
Figure 8B:
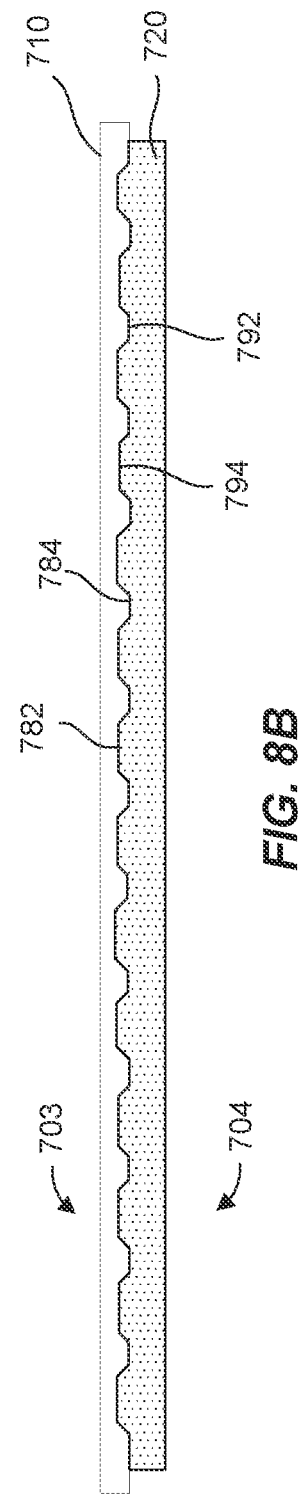
Figure 8C:
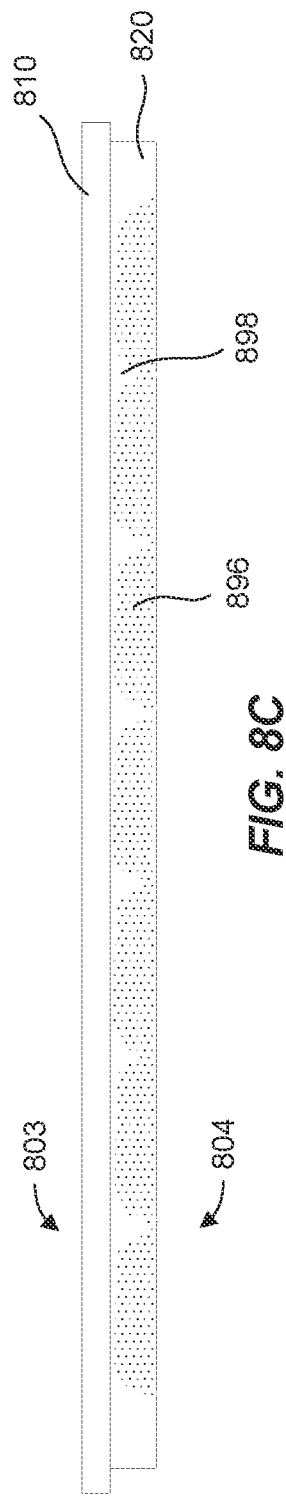

The compliant ferrous backing (see the compliant ferrous backing 120 of FIGS. 1-4) can be adhered to the reflective face sheet, such as reflective face sheets 110, 310, 410, 510, regardless of the configuration of the reflective face sheet as it is designed and configured to conform to the reflective face sheet, FIGS. 8A-8C show examples of an interface between the reflective face sheet and the compliant ferrous backing. In FIG. 8A, an interface between a uniform reflective face sheet 610 and a compliant ferrous backing 620 is shown. Similar as was described above, the compliant ferrous backing 620 is adhered to the back side 604 of the reflective face sheet 610. The compliant ferrous backing 620 can be adhered to the reflective face sheet 610 by way of an adhesive binder, such as an epoxy or other material used to form the compliant ferrous backing, or by way of a separate adhesive.

FIG. 8B shows an interface between a non-uniform reflective face sheet 710 and a compliant ferrous backing 720. Similar as was described above, the compliant ferrous backing 720 is adhered to the back side 704 of the reflective face sheet 710. The compliant ferrous backing 720 can be adhered to the reflective face sheet 710 by way of an adhesive binder, such as an epoxy or other material used to form the compliant ferrous backing 720, or by way of a separate adhesive.

In this example, the non-uniform reflective face sheet 710 comprises a plurality of relatively thicker portions and areas 784 as compared to a plurality of thinner portions and areas 782 formed in a back side 704 of the reflective face sheet 710. The non-uniform reflective face sheet 710 can take on a variety of shapes and thickness similar to the reflective face sheets 310, 410, 510 described above. The compliant ferrous backing 720 is molded or formed onto the back side 703 of the reflective face sheet 710 to conform to the topography of the back side 704 of the reflective face sheet 710. Accordingly, the compliant ferrous backing 720 comprises relatively thicker portions and areas 794 that conform into the relatively thinner portions and areas 782 of the reflective face sheet 710, as well as relatively thinner portions and areas 792 that conform around the relatively thicker portions and areas 784 of the reflective face sheet 710. FIGS. 8A and 8B further illustrate compliant ferrous backings having uniformly distributed ferrous particles throughout.

In one example shown in FIG. 8C, a uniform reflective face sheet 810 (or non-uniform reflective face sheet) can interface with a compliant ferrous backing 820 where the ferrous particles are distributed non-uniformly throughout the compliant ferrous backing 820. In this example, the compliant ferrous backing 820 has relatively high ferrous particle concentration portions 896 having a relatively higher concentration of the ferrous particles and relatively low or no ferrous particle concentration portions 898 having a relatively lower concentration of the ferrous particles, or none at all. Indeed, the high ferrous particle concentration portions 896 can include portions of the compliant ferrous backing 820 in which ferrous particles are distributed, and the low ferrous particle concentration portions 898 can include portions of the compliant ferrous backing 820 in which no ferrous particles are distributed. In other examples, ferrous particles can be distributed throughout the compliant ferrous backing 820, but are distributed in a higher concentration in the relatively high ferrous particle concentration portions 896 as compared to the relatively low ferrous particle concentration portions 898.

In one example, the compliant ferrous backing 820 can be formed by first curing the relatively high ferrous particle concentration portions 896 in a desired pattern. Then, the relatively low or no ferrous particle concentration portions 898 are cured together with the relatively high ferrous particle concentration portions 896 to form the compliant ferrous backing 820. Other manufacturing methods can also be used.

Using the uniform reflective face sheet 810 with the above describe compliant ferrous backing 820 having ferrous particles distributed non-uniformly throughout the compliant ferrous backing provides several advantages. For example, the production of the reflective face sheet 810 can be kept relatively simple and cheap as compared to producing a non-uniform reflective face sheet. At the same time, the non-uniform distribution of the ferrous particles throughout the compliant ferrous backing 820 can provide similar advantages as when the non-uniform reflective face sheet is used. For example, the positioning, distribution, and configuration of the relatively high ferrous particle concentration portions 896 can facilitate accurate control the actuator strokes and can increase in the maximum size of the actuator strokes.

The high and low ferrous particle concentration portions 896, 898 can form a pattern in the compliant ferrous backing 820. The pattern may be any suitable pattern and can include any shape or combination of shapes, lines, curves, etc. of any suitable size or configuration. For example, the pattern can comprises an array or matrix of polygon shapes (e.g., hexagons in a "honeycomb" pattern).

In another example, the pattern can be defined by various or random shapes, lines, curves, etc. of various sizes. In one aspect, the pattern can have a symmetrical relationship with the outer or perimeter shape of the compliant ferrous backing 820, which can provide a symmetric or uniform distribution of the high and low ferrous particle concentration portions 896, 898 defining the pattern in the compliant ferrous backing 820.

On the other hand, the pattern can have an asymmetrical relationship with the outer or perimeter shape of the compliant ferrous backing 820 which can provide an asymmetric or non-uniform distribution of the high and low ferrous particle concentration portions 896, 898 defining the pattern in the compliant ferrous backing 820.

In one aspect, the pattern of the high and low ferrous particle concentration portions can be defined and configured to correspond to one or more electromagnets of a deformable mirror. For example, a size, location, etc. of a high ferrous particle concentration portion 896 can be configured to facilitate responsiveness to actuation of one or more electromagnets (e.g., increase actuator stroke). The transition from a high ferrous particle concentration portion 896 to a low ferrous particle concentration portion 898 of the compliant ferrous backing 820 can be formed in any suitable manner. For example, the transition from a high ferrous particle concentration portion 896 to a low ferrous particle concentration portion 898 can comprise an abrupt or step change in ferrous particle distribution, a gradual change in distribution, or a combination of these.

The compliant ferrous backing 820 can be adhered to the back side 804 of the reflective face sheet 810. The compliant ferrous backing 820 can be adhered to the reflective face sheet 810 by way of an adhesive binder, such as an epoxy or other material used to form the compliant ferrous backing 820, or by way of a separate adhesive.

The above described examples of a deformable mirror system and deformable mirror provide several advantages and benefits. For example, significant stroke improvement can be achieved as well as stroke control. In one example, where a prior art system (e.g. a system utilizing a Ferro fluid or piezoelectric direct actuators) having a reflective face sheet with a given configuration can achieve peak strokes from around 6 μm-10 μm, the deformable mirror system described herein using a similar reflective face sheet can achieve a peak stroke of up to 17 μm due to the actuation of the compliant ferrous backing and the interface between the compliant ferrous backing and the reflective face sheet.

Other advantages of the above described system and mirror include the elimination of the need for liquid containment which can pose risks of leaks, allowing for the above described system and mirror to provide a robust design for use in a variety of applications. Additionally, the above described system can be formed with relatively few parts, including interchangeable parts allowing for faster and cheaper manufacturing and increasing reparability. The compliant ferrous backing material used in the above described system and mirror can also be easily tuned to a specific design need.

In operation, the deformable mirror system and deformable mirror can be deformed based on the actuation of the electromagnets which locally attract the compliant ferrous backing to deform the deformable mirror. The deformation of the deformable mirror can be controlled to correct alignment in an optical system, to correct or optimize dynamic wave front error and aberrations, or the like.

In some examples, the electromagnets can be controlled to vary the strength of the magnetic field produced by the electromagnets. In one example, a deformable mirror system can be provided where the electromagnets can actuate the deformable mirror with a 10 μm stroke. That is, the electromagnets can attract the compliant ferrous backing to locally pull and deform the deformable mirror a distance of 10 μm. When the system is activated the electromagnets can be actuated to create a magnetic field sufficiently strong to poke the deformable mirror at a distance of 5 μm, which can be considered a zero position. If a portion of the deformable mirror needs to be raised, the electromagnet can decrease the strength of the electromagnetic field to allow the portion of the deformable mirror to rise, such as up to 5 μm in this example. If a portion of the deformable mirror needs to be lowered, the electromagnet can increase the strength of the electromagnetic field to further deform and lower the portion of the deformable mirror up to 5 μm in this example.

Figure 9:
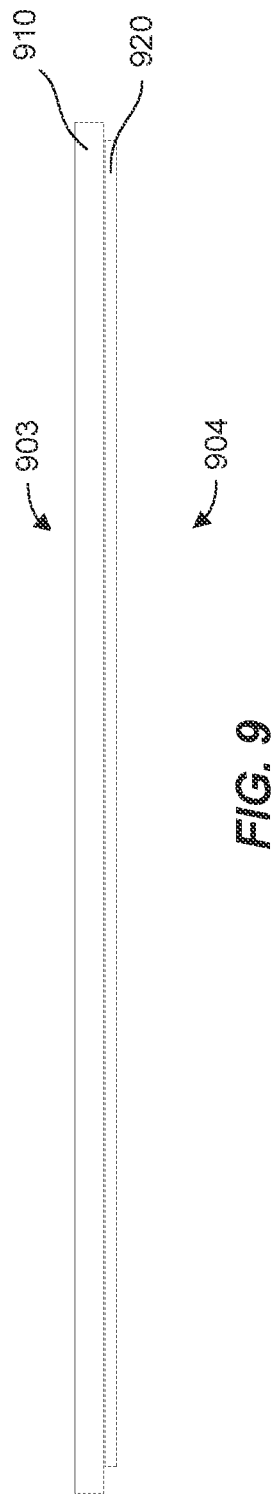
FIG. 9 illustrates a mirror assembly of a deformable mirror, the mirror assembly comprising a reflective face sheet and a thin ferrous metallic backing in accordance with another example of the present disclosure.

Various modifications can be made to the above described systems and deformable mirrors in accordance with the present disclosure. For example, instead of the mirror assembly comprising a compliant ferrous backing, a thin ferrous or magnetic metallic backing could be used within the mirror assembly of a deformable mirror, such as the various mirror assemblies discussed above and shown in the drawings. As shown in FIG. 9, the mirror assembly can comprise a thin ferrous metallic backing 920 positioned adjacent a back side 904 of the reflective face sheet 910. The thin ferrous metallic backing 920 can be adhered or otherwise attached or positioned adjacent to (and not necessarily joined together, but could be) a reflective face sheet 910 on a back side 904 of the reflective face sheet 910. The thin ferrous metallic backing 920 can be formed from a magnetically attracted material, such as iron, steel, cobalt, or nickel. The thin metallic backing 920 can be operable similar to the compliant ferrous backing described above in that it can facilitate select, precision deformations within the mirror assembly, and specifically deformation of the reflective face sheet 910, via actuation of one or more electromagnets (as described above) that function to induce a magnetic field that acts upon the thin ferrous metallic backing. The thin ferrous metallic backing 920 can be sized and configured or formed to be sufficiently thin so as to be able to flex or deform upon actuation of the electromagnets and with the reflective face sheet 910, as well as to conform to the profile of the back side 904 of the reflective face sheet 910, whether uniform or non-uniform.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided; such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A deformable mirror, comprising:
   a mirror assembly comprising (i) a reflective face sheet having a reflective surface on a front side of the reflective face sheet and (ii) one or more ferrous materials selectively positioned within the mirror assembly, wherein the reflective face sheet has a non-uniform thickness between the front side of the reflective face sheet and a back side of the reflective face sheet opposite the front side; and one or more electromagnets configured to generate a magnetic field that acts on the one or more ferrous materials to deform the reflective face sheet.

2. The deformable mirror of claim 1, wherein the non-uniform thickness of the reflective face sheet is defined by an asymmetrical relationship with an outer shape of a perimeter of the reflective face sheet.

3. The deformable mirror of claim 1, further comprising: a base configured to support the mirror assembly and the one or more electromagnets.

4. The deformable mirror of claim 3, wherein the base comprises one or more mounting features configured to mount the one or more electromagnets to the base.

5. The deformable mirror of claim 1, wherein the one or more electromagnets are positioned relative to the back side of the reflective face sheet.

6. The deformable mirror of claim 1, wherein the one or more electromagnets comprise a plurality of electromagnets.

7. The deformable mirror of claim 1, wherein:
the mirror assembly further comprises a compliant ferrous backing attached to the back side of the reflective face sheet; and
the one or more ferrous materials comprise ferrous particles embedded into the compliant ferrous backing.

8. The deformable mirror of claim 7, wherein the ferrous particles are distributed non-uniformly throughout the compliant ferrous backing.

9. The deformable mirror of claim 7, wherein the compliant ferrous backing comprises a first portion having a higher concentration of the ferrous particles than a second portion of the compliant ferrous backing.

10. The deformable mirror of claim 9, wherein:
the first portion is one of a plurality of first portions of the compliant ferrous backing;
the second portion is one of a plurality of second portions of the compliant ferrous backing; and
the first and second portions form a pattern in the compliant ferrous backing.

11. The deformable mirror of claim 10, wherein the pattern in the compliant ferrous backing comprises an array of polygon shapes.

12. The deformable mirror of claim 1, wherein the non-uniform thickness of the reflective face sheet is defined by a pattern formed in the back side of the reflective face sheet.

13. The deformable mirror of claim 12, wherein the pattern formed in the back side of the reflective face sheet comprises an array of polygon shapes.

14. The deformable mirror of claim 12, further comprising:
a compliant ferrous backing molded to fit within the pattern formed in the back side of the reflective face sheet;
wherein the one or more ferrous materials comprise ferrous particles embedded into the compliant ferrous backing.

15. The deformable mirror of claim 1, wherein;
the mirror assembly further comprises a ferrous metallic backing positioned adjacent to the back side of the reflective face sheet; and
the ferrous metallic backing comprises at least one ferrous material of the one or more ferrous materials.

16. A deformable mirror system, comprising:
a deformable mirror comprising:
a mirror assembly comprising (i) a reflective face sheet having a reflective surface on a front side of the reflective face sheet and (ii) one or more ferrous materials selectively positioned within the mirror assembly, wherein the reflective face sheet has a non-uniform thickness between the front side of the reflective face sheet and a back side of the reflective face sheet opposite the front side; and
one or more electromagnets configured to generate a magnetic field that acts on the one or more ferrous materials to deform the reflective face sheet; and
a control system operably coupled to the one or more electromagnets and configured to control the magnetic field to deform the reflective face sheet.

17. The deformable mirror system of claim 16, wherein:
the mirror assembly further comprises a compliant ferrous backing attached to the back side of the reflective face sheet; and
the one or more ferrous materials comprise ferrous particles embedded into the compliant ferrous backing.

18. The deformable mirror system of claim 17, wherein the ferrous particles are distributed non-uniformly throughout the compliant ferrous backing.

19. The deformable mirror system of claim 17, wherein the compliant ferrous backing comprises a first portion having a higher concentration of the ferrous particles than a second portion of the compliant ferrous backing.

20. The deformable mirror system of claim 19, wherein:
the first portion is one of a plurality of first portions of the compliant ferrous backing;
the second portion is one of a plurality of second portions of the compliant ferrous backing; and
the first and second portions form a pattern in the compliant ferrous backing.

21. The deformable mirror system of claim 20, wherein the pattern in the compliant ferrous backing comprises an array of polygon shapes.

22. The deformable mirror system of claim 16, wherein the non-uniform thickness of the reflective face sheet is defined by an asymmetrical relationship with an outer shape of a perimeter of the reflective face sheet.

23. The deformable mirror system of claim 16, wherein the non-uniform thickness of the reflective face sheet is defined by a pattern formed in the back side of the reflective face sheet.

24. The deformable mirror system of claim 23, wherein the pattern formed in the back side of the reflective face sheet comprises an array of polygon shapes.

25. The deformable mirror system of claim 23, further comprising:
a compliant ferrous backing molded to fit within the pattern formed in the back side of the reflective face sheet;
wherein the one or more ferrous materials comprise ferrous particles embedded into the compliant ferrous backing.

26. The deformable mirror system of claim 16, wherein:
the mirror assembly further comprises a ferrous metallic backing positioned adjacent to the back side of the reflective face sheet; and
the ferrous metallic backing comprising at least one ferrous material of the one or more ferrous materials.

27. The deformable mirror system of claim 16, wherein the mirror assembly further comprises a base configured to support the mirror assembly and the one or more electromagnets.

28. The deformable mirror system of claim 27, wherein the base comprises mounting features configured to mount the one or more electromagnets to the base.

29. A method for facilitating active shape control of a mirror, comprising:
   obtaining a mirror assembly comprising a reflective face sheet having a reflective surface on a front side of the reflective face sheet, wherein the reflective face sheet has a non-uniform thickness between the front side of the reflective face sheet and a back side of the reflective face sheet opposite the front side;
   selectively positioning one or more ferrous materials within at least a portion of the mirror assembly; and
   disposing one or more electromagnets about the mirror assembly, the one or more electromagnets configured to generate a magnetic field that acts on the one or more ferrous materials to deform the reflective face sheet.

30. The method of claim 29, further comprising:
   adhering a compliant ferrous backing onto the back side of the reflective face sheet;
   wherein the one or more ferrous materials comprise ferrous particles embedded into the compliant ferrous backing.

31. The method of claim 30, wherein the ferrous particles are distributed non-uniformly throughout the compliant ferrous backing.

32. The method of claim 31, wherein the compliant ferrous backing comprises a first portion having a higher concentration of the ferrous particles than a second portion of the compliant ferrous backing.

33. The deformable mirror system method of claim 32, wherein:
   the first portion is one of a plurality of first portions of the compliant ferrous backing;
   the second portion is one of a plurality of second portions of the compliant ferrous backing; and
   the first and second portions form a pattern in the compliant ferrous backing.

34. The method of claim 33, wherein the pattern in the compliant ferrous backing comprises an array of polygon shapes.

35. The method of claim 29, further comprising:
   positioning a ferrous metallic backing adjacent to the back side of the reflective face sheet;
   wherein the ferrous metallic backing comprises at least one ferrous material of the one or more ferrous materials.

36. The method of claim 29, wherein the non-uniform thickness of the reflective face sheet is defined by an asymmetrical relationship with an outer shape of a perimeter of the reflective face sheet.

37. The method of claim 29, further comprising:
   supporting the mirror assembly and the one or more electromagnets using a base.

38. The method of claim 37, further comprising:
   mounting the one or more electromagnets to the base using one or more mounting features.

\* \* \* \* \*